United States Patent [19]

Johnston et al.

[11] 4,004,840
[45] Jan. 25, 1977

[54] BEARING CAGE

[75] Inventors: Gordon Boyd Johnston, Beesd, Netherlands; Hasse Eivind Strandberg, Floda, Sweden

[73] Assignee: SKF Industrial Trading and Development Company, B.V., Nieuwegein, Netherlands

[22] Filed: Jan. 31, 1975

[21] Appl. No.: 545,893

[30] Foreign Application Priority Data

Feb. 6, 1974 Netherlands .................. 7401604

[52] U.S. Cl. ............................................. 308/201
[51] Int. Cl.$^2$ ...................................... F16C 33/46
[58] Field of Search ................. 308/201, 217, 235; 29/148.4 C

[56] References Cited

UNITED STATES PATENTS

| 1,168,937 | 1/1916 | Eitner | 308/201 |
|---|---|---|---|
| 2,146,440 | 2/1939 | Pew | 308/201 |
| 3,758,180 | 9/1973 | Asberg | 308/201 |

FOREIGN PATENTS OR APPLICATIONS 544,310   6/1922   France .............................. 308/201

Primary Examiner—Robert R. Song
Assistant Examiner—Richard A. Bertsch
Attorney, Agent, or Firm—Daniel M. Rosen

[57] ABSTRACT

Cage for a bearing which is only axially insertable from one side of a bearing which comprises an inner race ring and an outer race ring both provided with an integral flange and rows of rolling elements running in race ways between said rings, each two adjacent rolling elements out of two rows in circumferential direction of the bearing being separated in relation to the next pairs of rolling elements by a bearing cage member, characterized in that said bearing cage-partition member has such a shape that it is elastically compressible at least in radial direction, such that the rolling elements during loading of the bearing both in the same as well as in the adjacent race way can take relatively small distance differences in relation to each other.

4 Claims, 4 Drawing Figures

BEARING CAGE

The invention relates to a bearing cage which is only axially insertable from one side of a bearing which comprises an inner race ring and an outer race ring both provided with an integral flange and rows of rolling element running in race ways between said rings, each two adjacent rolling elements out of two rows in circumferential direction of the bearing being seperated in relation to the next pairs of rolling elements by a bearing cage member.

A bearing cage of this type is known for example from the U.S. Pat. No. 3,758,180. This patent disclosed a bearing cage of the so-called "snap" type provided with an annular side member with axially partitions projecting from said member. These partitions are generally parallel to each other and separate pairs of rolling elements. Such a bearing cage is also applied in a bearing comprising rings which are integrally provided with flanges. These type of bearings are especially used in the transportation techniques mainly as wheel bearings in automobiles.

The invention now introduces a bearing cage for the said type bearing which exposed to high loads and suddenly changing bending moments still functions in a reliable way. To that end the bearing cage-partition member has such a shape that is elastically compressible in radial direction such that the rolling elements during loading of the bearing both in the same as well as in the adjacent race way can take relatively small distance difference in relation to each other.

According to a preferred embodiment of a bearing cage of the aforementioned type which cage comprises an annular member with partitions projecting therefrom into snapfingers for accomodating rolling elements, said cage is characterized in that a partition is provided with one or more recesses. By means of these measures a bearing cage according to the invention can easily and flexible adapt itself under different load conditions such as changing in rotational speeds of the rolling elements in the rows due to the high and suddenly changing bending moments which can be generated in such wheel hub bearings.

The invention will further be described in connection with the drawing by which advantages and other features of the invention will appear.

Figure 1:
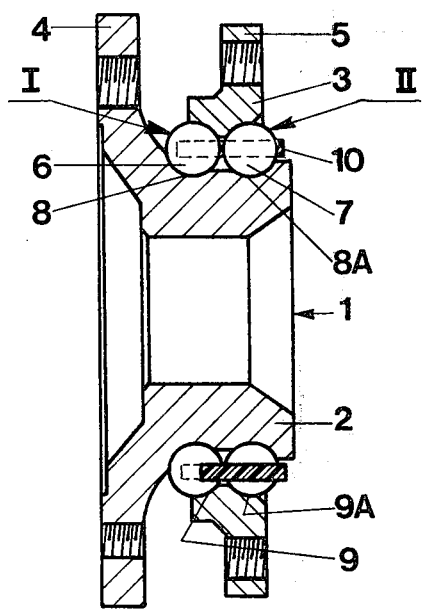
FIG. 1 is a cross sectional view of a bearing provided with a cage according to the invention.

According to FIG. 1 the bearing comprises an inner race ring 2 and an outer race ring 3, both rings being provided with an integral flange 4, 5 respectively, to which for example the hub of a wheel or a part of a brake system of a vehicle can be fastened. The bearing further comprises two rows (I,II) of rolling elements consisting of balls 6,7 resp. mounted on running surfaces 8, 8A; 9, 9A resp. of the inner race ring 2 and outer race ring 3 resp. The rolling elements being separated on specified distances from one another in the direction of rotation by a bearing cage 10. The insertion of the rolling elements or balls 6 and 7 in such bearings is effected by displacing one of the bearing rings eccentrically with regard to the other, thereby providing a sickel-shaped gap, permitting the insertion of a certain number of balls between the inner and outer ring. Thereafter the rings are centered, and the balls distributed around the running faces by inserting the bearing cage 10 axially between the balls. In this embodiment the balls 6 and 7 are separated in pairs (see FIG. 2,3 and 4), each pair being separated from the following pair of balls in rows I and II by means of partitions 11. It is preferable to apply a snap-type bearing cage, the mounting of such bearing cage requiring some effort for fixing the snap-fingers 12 over the rolling elements or balls. It will be evident that the bearing as shown in FIG. 1 will be exposed — at least during operation — to considerably changing loads and bending moments, which often are of a different origin than those affecting conventional roller bearings, and which involve the risk that the balls in one of the rows will rotate at a higher rate than those in the other row. In that case relative high frictional forces arise which could cause the expelling of the cage out of the bearing.

Figure 2:
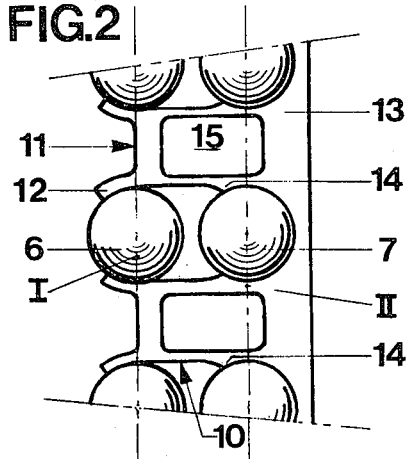
FIG. 2–4 represent the views of a part of bearing cages which can be applied in a bearing according to FIG. 1.

FIG. 2 (as well as the FIGS. 3 and 4) shows a part of a bearing cage according to the invention made of an amide or acetate or similar stable synthetic material. The embodiment comprises an annular member 13 with partitions 11 projecting from it with at the end of each partition two diverging parts or snapfingers 12. The snap fingers 12 partly fit around balls 6 of row I, while the balls 7 of row II are partly enclosed by recesses 14. This preferably embodiment comprises a partition II which is provided with an essentially rectangular recess or notch 15 which preferably is arranged between the vertical planes through rows I and II. Arrangement a very advantageous a flexible partition between pairs of rolling elements is achieved, which means that differences in distance appearing between the rolling elements during loading of the bearing can be easily followed by the bearing cage, so that expelling of the cage from the bearing is prevented.

Figure 3:
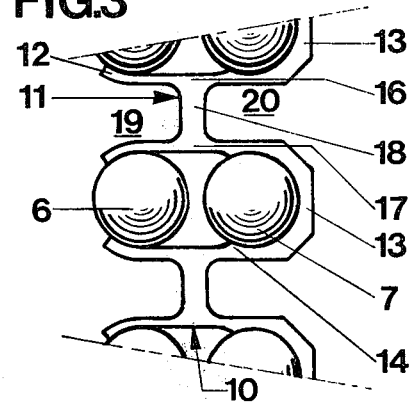

FIG. 3 shows a bearing cage according to the invention where by the partition-member 11 substantially consists of strip-like elements 16 and 17 projecting from the annular member 13 and partly fit around the rolling elements 6 and 7. The elements 16 and 17 being mutually connected by a connecting member 18, or in reversed sense; the cage 10 made of a synthetic material comprises a partition member 11 provided with rectangular recesses or notches (19 and 20) which are placed on both sides or the middle (18) of the partition (11) having an open end-part to the annular member (13) and the snap-fingers (12) respectively. By this addition to the resilient or flexible adaption of the bearing cage to the mutual changing positions of the rolling elements also a "hinge action" is introduced between cage parts 16, 17 comprising pairs of rolling elements 6,7 so that an optimal adaption of the bearing cage 10 to different load conditions of this type of bearing has been achieved.

Figure 4:
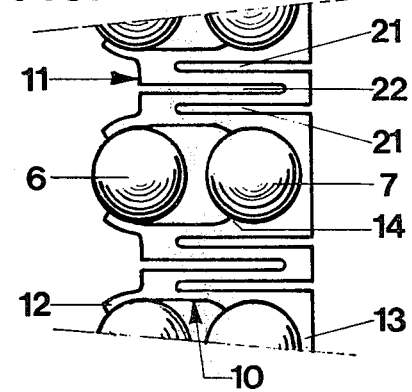

FIG. 4 shows a part of a bearing cage according to the invention wherein the partition 11 is provided with a slot- or groove-like notches 21 and 22 extending on relative great distances in axial direction of the bearing. By this a bearing cage with an elastic partition member 11 is obtained which in view of the production is very interesting, in other words; this cage can easily be produced in great quantities without loosing the advantages as described. It is observed that a bearing cage according to the invention can be made of different materials, for example a reinforced material or a combination of a synthetic material and a metal or glass fibre reinforced synthetic material.

We claim:

1. In a bearing having an inner race ring and an outer race ring, two rows of rolling elements positioned to roll between said rings in raceways in said rings and thereby to define two axially-spaced planes, with the rolling elements in the two rows being positioned to form pairs of axially aligned rolling elements, and a generally cylindrical bearing cage insertible axially from one side of the bearing and having holding means for holding separate said pairs of rolling elements and circumferentially separating each pair of axially aligned rolling elements from the adjacent pairs of rolling elements, the improvement wherein said bearing cage comprises a plurality of partitions, means connecting said partitions with an axially-extending recess defined between each two adjacent partitions, said cage being elastically compressible in the radial direction of said bearing, whereby during loading of said rolling elements in said raceway are moveable relative to each other, said cage further comprising two axially-extending, diverging snap-fingers on each of said partitions for defining said holding means, said partitions having radially extending apertures between the planes of the two rows of rolling elements, wherein said apertures comprise a first slot extending axially in each partition from one axial end thereof, and a second slot extending axially in each of said partitions from the other axial end of said bearing cage and circumferentially overlapping said first slot in a region of said partitions between said planes.

2. In a bearing having an inner race ring and an outer race ring, two rows of rolling elements positioned to roll between said rings in raceways in said rings, said two rows defining two axially spaced planes, with the rolling elements in the two rows situated as pairs of axially aligned rolling elements, and a bearing cage insertible axially from one side of said bearing and having holding means for holding separate said pairs of rolling elements and circumferentially separating pair of axially aligned rolling elements from the adjacent pair of rolling elements, the improvement wherein said bearing cage comprises an annular unitary member of a flexible material having axially extending recesses which are closed at one end and open at the other, with partition portions circumferentially separating said recesses, and snap-fingers extending axially from said partition portions, whereby said snap-fingers and recesses define said holding means, said partition portions having apertures at least in one region thereof between said planes of rolling elements, whereby said partitions are elastic and the rolling elements of each said pairs as well as adjacent rolling elements in each row may be moved relative to each other, said bearing cage further comprising an annular portion situated at one axial end thereof and defining one axial end of said apertures with the first of said two planes near this end, and said partition portions have circumferentially-extending connecting portions in the region of the second plane, said connecting portions defining the other axial end of said apertures, said apertures extending axially through the first plane toward said annular portion.

3. In a bearing having an inner race ring and an outer race ring, two rows of rolling elements positioned to roll between said rings in raceways in said rings, said two rows defining two axially spaced planes, with the rolling elements in the two row situated as pairs of axially aligned rolling elements, and a bearing cage insertible axially from one side of said bearing and having holding means for holding separate said pairs of rolling elements and circumferentially separating each pair of axially aligned rolling elements from the adjacent pair of rolling elements, the improvement wherein said bearing cage comprises an annular unitary member of a flexible material having axially extending recesses which are closed at one end and open at the other, with partition portions circumferentially separating said recesses, and snap-fingers extending axially from said partition portions, whereby said snap-fingers and recesses define said holding means, said partition portions having apertures at least in one region thereof between said planes of rolling elements, whereby said partitions are elastic and the rolling elements of each said pairs as well as adjacent rolling elements in each row may be moved relative to each other, said apertures defining substantially rectangular recesses extending from opposite axial ends of said bearing cage in each said projections, said partition portions having circumferentially extending connecting portions separating the respective recesses in a region between said planes and axially spaced therefrom.

4. In a bearing having an inner race ring and an outer race ring, two rows of rolling elements positioned to roll between said rings in raceways in said rings, said two rows defining two axially spaced planes, with the rolling elements in the two rows situated as pairs of axially aligned rolling elements, and a bearing cage insertible axially from one side of said bearing and having holding means for holding separate said pairs of rolling elements and circumferentially separating each pair of axially aligned rolling elements from the adjacent pair of rolling elements, the improvement wherein said bearing cage comprises an annular unitary member of a flexible material having axially extending recesses which are closed at one end and open at the other, with partition portions circumferentially separating said recesses, and snap-fingers extending axially from said partition portions, whereby said snap-fingers and recesses define said holding means, said partition portions having apertures at least in one region thereof between said planes of rolling elements, whereby said partitions are elastic and the rolling elements of each said pairs as well as adjacent rolling elements in each row may be moved relative to each other, said apertures defining circumferentially overlapping slots extending from opposite axial ends of said bearing cage in each of said partition portions.

* * * * *

UNITED STATES PATENT AND TRADEMARK OFFICE
CERTIFICATE OF CORRECTION

PATENT NO. : 4,004,840
DATED : January 25, 1977
INVENTOR(S) : Gordon Boyd Johnston, et al It is certified that error appears in the above-identified patent and that said Letters Patent are hereby corrected as shown below:

Column 1, line 14, change "disclosed" to read --discloses-- .

line 28, after "that" insert --it--.

Column 2, line 30, delete "Ar" and insert --By this ar- --.

line 31, delete "a" (second occurance).

Column 3, line 19, after "said" insert --raceways, the rolling elements of each said pair of rolling elements and adjacent rolling elements in each--

Signed and Sealed this

Twenty-fourth Day of May 1977

[SEAL]

Attest:

RUTH C. MASON
*Attesting Officer*

C. MARSHALL DANN
*Commissioner of Patents and Trademarks*